United States Patent
Stavale et al.

(10) Patent No.: US 10,495,084 B2
(45) Date of Patent: Dec. 3, 2019

(54) METHOD FOR TWIN SCREW POSITIVE DISPLACEMENT PUMP PROTECTION

(71) Applicant: ITT MANUFACTURING ENTERPRISES LLC., Wilmington, DE (US)

(72) Inventors: Anthony E. Stavale, Union, KY (US); Robert Semidey, Farmington, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 491 days.

(21) Appl. No.: 15/227,529

(22) Filed: Aug. 3, 2016

(65) Prior Publication Data

US 2017/0211573 A1 Jul. 27, 2017

Related U.S. Application Data

(63) Continuation-in-part of application No. 13/859,899, filed on Apr. 10, 2013, now Pat. No. 9,745,979.
(Continued)

(51) Int. Cl.
*G05D 11/00* (2006.01)
*F04C 14/28* (2006.01)
(Continued)

(52) U.S. Cl.
CPC ............ *F04C 14/28* (2013.01); *F04C 2/16* (2013.01); *F04C 28/28* (2013.01);
(Continued)

(58) Field of Classification Search
USPC ....................................................... 700/282
See application file for complete search history.

(56) References Cited

U.S. PATENT DOCUMENTS 5,348,453 A * 9/1994 Baran ................. B29C 47/0845
417/440
5,754,421 A 5/1998 Nystrom
(Continued)

FOREIGN PATENT DOCUMENTS

CN 1977115 6/2007
CN 201730825 2/2011
(Continued)

OTHER PUBLICATIONS

CN1977115 English language Abstract (2 pages).
CN201730825 English language Abstract (1 page).

*Primary Examiner* — Suresh Suryawanshi
(74) *Attorney, Agent, or Firm* — Moritt Hock & Hamroff LLP; Bret P. Shapiro

(57) ABSTRACT

Techniques are provided for protecting a twin screw positive displacement pump, that include a signal processor that receives signaling containing information about power, torque, speed, viscosity and specific gravity related to the operation of the twin screw positive displacement pump; and determines whether to enter an enhanced pump protection mode for the twin screw positive displacement pump based on a relationship between an actual corrected tune ratio and a tuned ratio set point (Tune Ratio SP). In operation, the signal processor determines if the actual corrected tune ratio is<=the actual corrected tune ratio set point (Tune Ratio SP), and if so, then enters the enhanced pump protection mode, else continues to use a basic pump protection mode, and also determines the actual corrected tune ratio based on a ratio of an actual corrected torque (TAcorr) divided by a tuned corrected torque (TTcorr) at a specific operating speed.

19 Claims, 6 Drawing Sheets

Related U.S. Application Data

(60) Provisional application No. 62/205,205, filed on Aug. 14, 2015, provisional application No. 61/622,684, filed on Apr. 11, 2012.

(51) Int. Cl.
  *F04C 2/16* (2006.01)
  *F04C 28/28* (2006.01)
  *G01F 25/00* (2006.01)

(52) U.S. Cl.
  CPC ...... *G01F 25/0007* (2013.01); *F04C 2210/44* (2013.01); *F04C 2270/025* (2013.01); *F04C 2270/03* (2013.01); *F04C 2270/052* (2013.01); *F04C 2270/80* (2013.01); *F04C 2270/86* (2013.01)

(56) References Cited

U.S. PATENT DOCUMENTS

| | | | | |
|---|---|---|---|---|
| 5,779,451 | A * | 7/1998 | Hatton | F04C 2/16 417/205 |
| 5,930,092 | A | 7/1999 | Nystrom | |
| 7,862,315 | B2 * | 1/2011 | Rohlfing | F04C 2/086 418/201.1 |
| 8,191,619 | B2 * | 6/2012 | Orban | E21B 43/12 166/369 |
| 2005/0252205 | A1 | 11/2005 | Stavale et al. | |
| 2007/0154321 | A1 | 7/2007 | Stiles, Jr. et al. | |
| 2007/0212229 | A1 | 9/2007 | Stavale | |
| 2009/0098003 | A1 * | 4/2009 | Kothnur | F01C 21/02 418/205 |
| 2010/0278673 | A1 * | 11/2010 | Kothnur | F01C 21/02 418/1 |
| 2011/0103987 | A1 * | 5/2011 | Kothnur | F04C 2/16 418/1 |
| 2012/0018168 | A1 * | 1/2012 | Denny | E21B 43/128 166/369 |
| 2014/0056720 | A1 * | 2/2014 | Jackie | F04B 17/03 417/20 |
| 2014/0099225 | A1 * | 4/2014 | Denny | F04C 29/124 418/1 |
| 2015/0139843 | A1 * | 5/2015 | Meyer | F04C 15/0096 418/54 |

FOREIGN PATENT DOCUMENTS

| | | |
|---|---|---|
| WO | 2001088379 | 11/2001 |
| WO | 2013155136 A2 | 10/2013 |

* cited by examiner

Apparatus 10

A signal processor 12 configured to

Receive signaling containing information about power, torque, speed, viscosity and specific gravity related to the operation of the twin screw positive displacement pump 14;

Determine whether to enter an enhanced pump protection mode for the twin screw positive displacement pump based at least partly on a relationship between an actual corrected tune ratio and a tuned ratio set point (Tune Ratio SP); and Provide a control signal containing information to control the operation of the twin screw positive displacement pump 14, including shutting the twin screw positive displacement pump off when a dry run condition is determined in the enhanced pump protection mode.

A rotary positive displacement pump 14, including a twin screw pump

A module 16 configured to

Provide the signaling containing information about power, torque, speed, viscosity and specific gravity related to the operation of the rotary positive displacement pump 14; and Receive the control signal containing information to control the operation of the twin screw positive displacement pump 14, including shutting the twin screw positive displacement pump off when the dry run condition is determined in the enhanced pump protection mode.

Figure 2

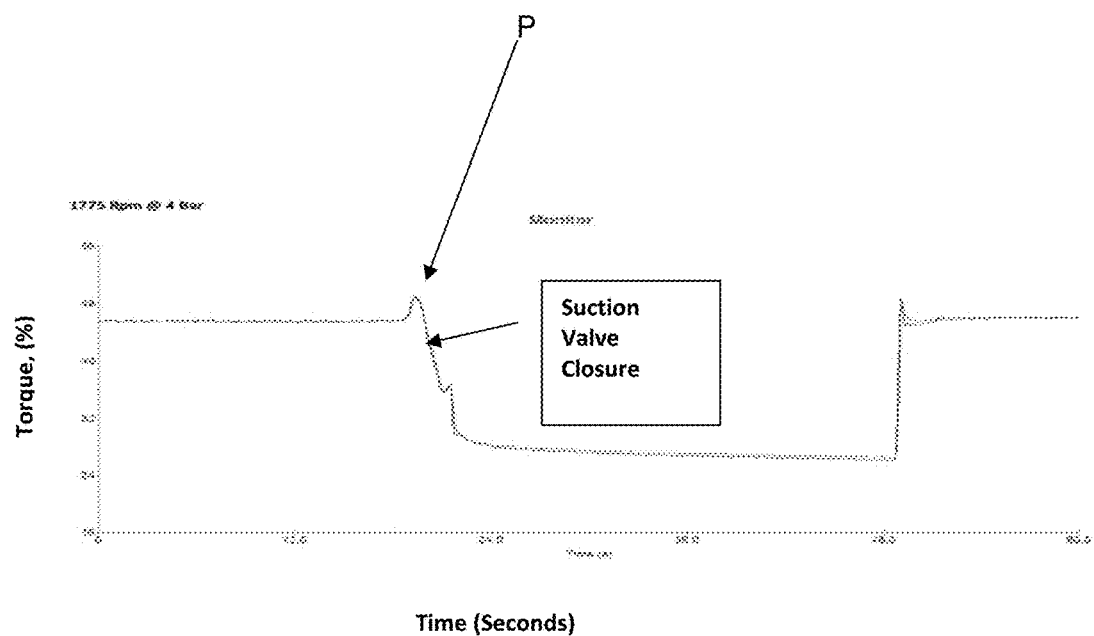
Figure 7: Dry Run Trial

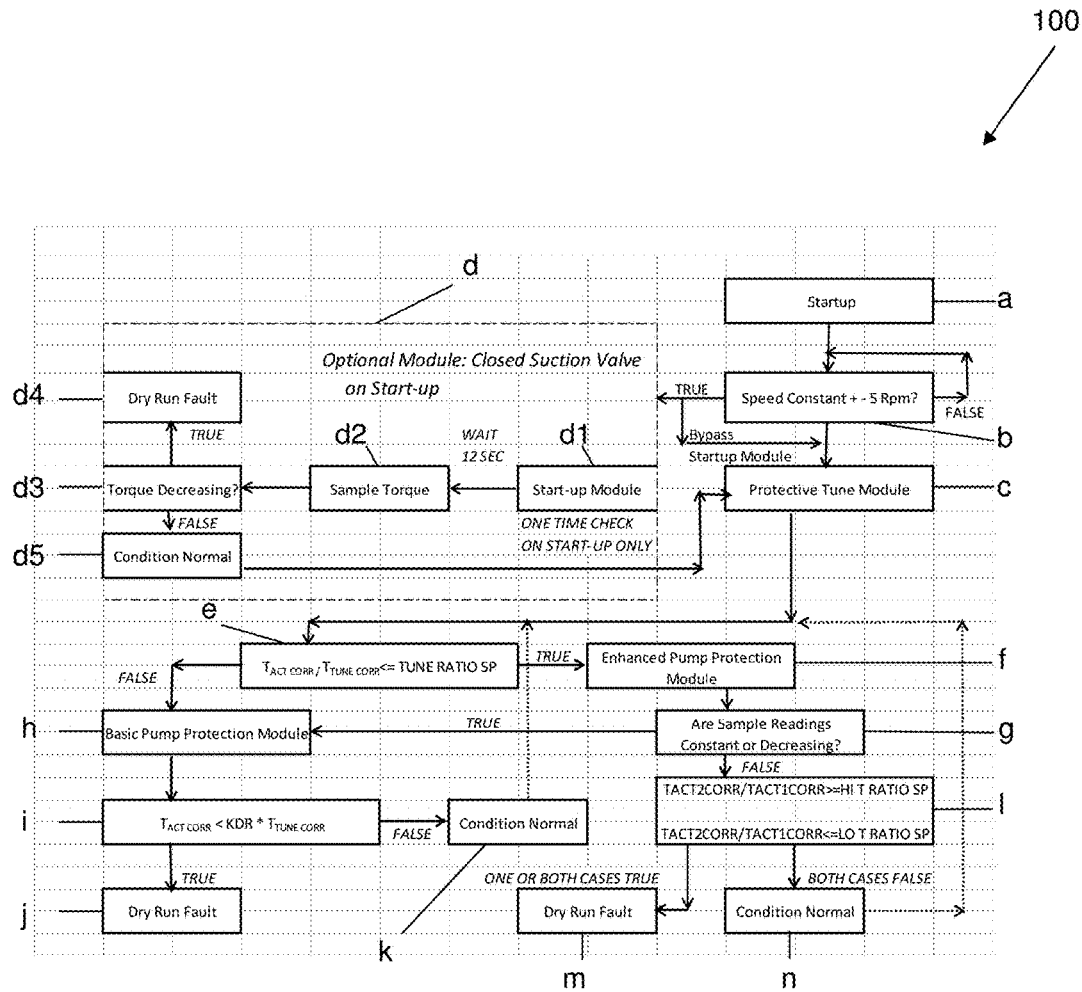
Figure 8: Pump protection Flowchart

METHOD FOR TWIN SCREW POSITIVE DISPLACEMENT PUMP PROTECTION

CROSS-REFERENCE TO RELATED APPLICATIONS

This application claims benefit to provisional patent application Ser. No. 62/205,205, filed 14 Aug. 2015, which is hereby incorporated by reference in its entirety.

This application is also a continuation-in-part of, and claims benefit to, patent application Ser. No. 13/859,899, filed 10 Apr. 2013, entitled "Method for rotary positive displacement pump protection," which itself claims benefit to provisional patent application Ser. No. 61/622,684, filed 11 Apr. 2012, which are both hereby incorporated by reference in its entirety.

The parent application Ser. No. 13/859,899 is directed towards rotary positive displacement pump protection, e.g., for gear and progressive cavity pumps; while the present application is directed towards rotary positive displacement pump protection, e.g., for twin screw pumps.

BACKGROUND OF THE INVENTION

1. Field of the Invention

This application relates to a rotary positive displacement pump, such as a twin screw pump, an internal or external gear pump, a lobe pump, a vane pump or a progressive cavity pump; and more particularly, relates to techniques for protection, e.g., for a dry run condition, for such a rotary positive displacement pump, including such a twin screw pump.

2. Brief Description of Related Art

Many different types or kinds of pumps and external protective devices, including rotary positive displacement pumps with external protection devices, are known in the art. By way of example, some known external protection device disadvantages associated with the same and set forth below:

One known device PMP 25, provided by a company named Load Controls, Inc. (Sturbridge, Mass.), uses a load monitor technique that provides pump protection by observing the motor amperage draw and speed and then correlating the resulting power reading to various operating conditions (e.g. dry running, closing valves). See U.S. Pat. Nos. 5,930,092 and 5,754,421, which are hereby incorporated by reference in their entirety. One disadvantage of this known device is that it is suitable only for constant speed applications and fails to distinguish control differentiation from various system upset conditions.

Another known device, provided by a company named ABB Industry Oy (Helsinki, Finland), uses a technique based on a variable frequency drive that has parameters that allow maximum and minimum torque values to be configured to prevent the load driver (motor) from operating outside of these parameters. One disadvantage of this variable frequency drive technique is that it does not provide logic for interpreting normal operating conditions from system upsets, such as distinguishing between a higher power requirement due to increased system resistance versus a higher torque condition caused by dry running.

Other known devices consist of flow or pressure switches or liquid presence/absence detectors to identify undesired operating conditions. However, the use of additional process flow or pressure switches adds cost and complexity to the drive system, a potential failure point, and unnecessary cost.

U.S. patent application Ser. No. 11/601,373, filed 17 Nov. 2006, entitled "Pump Protection Without the Use of Traditional Sensors," by A. Stavale et al., which was published as US 2007/0212229 A1 and is incorporated by reference in its entirety, sets forth techniques for providing pump protection for centrifugal pumps. Centrifugal pumps have a very different principle of operation than do rotary positive displacement pumps. In centrifugal pumps power varies as the cube of the speed change (FIG. 1) and torque varies as the square of the speed change. In addition, the tune process for dry run protection of centrifugal pumps described in patent application Ser. No. 11/601,373 is performed at a closed valve condition. The tune process for dry run protection of rotary positive displacement pumps could not be performed at the closed valve condition, since rotary positive displacement pumps will quickly destroy itself if operated at closed valve condition without intervention. For these reasons, the techniques disclosed in patent application Ser. No. 11/601,373 would not be applied to rotary positive displacement pumps.

None of the aforementioned patents or publications teach or suggest the technique described herein for providing pump protection for rotary positive displacement pumps, as set forth below.

Furthermore, twin screw positive displacement (PD) pumps are quite different in construction from other rotary PD pumps such as gear pumps and progressive cavity pumps. For example, twin screw pumps do not have rotor to rotor rubbing contact (like gear pumps) or rotor to stationary housing contact (like progressive cavity pumps) when operating under dry run or partial dry run conditions. As such twin screw pumps are able to operate for extended time periods before damage can occur. Since rubbing contact does occur in these other rotary PD pumps, failure can occur quickly when operating in a dry run condition. In addition, torque signatures differ greatly between rotary PD pumps and twin screw pumps. For example, rotary PD pumps can provide a robust torque ripple signature when operating under dry run conditions. In contrast, twin screw pumps have a torque signature which provides little change between normal operating conditions and a distressed operating condition. It was found that the algorithms created for rotary PD pumps cannot reliably detect dry run conditions for twin screw pumps without modification.

SUMMARY OF THE INVENTION

The present invention provides new and unique techniques for protecting rotary positive displacement pumps, including twin screw pumps, while differentiating between dangerous operating conditions such as dry running which can result in catastrophic damage if left to operate without intervention. Examples of rotary positive displacement pumps are internal or external gear pumps, lobe pumps, vane pumps and progressive cavity pumps. The methodology relies on two types of protection to increase robustness and response time. Providing a robust pump protection solution while avoiding nuisance faults can be difficult. In order to use power, or torque measurements to detect a dry run condition the following must be considered: power and torque varies with specific gravity, viscosity, differential pressure and speed changes. Speed is the easiest parameter to contend with as it can be measured directly. For varying temperature systems the power and torque comparisons must all be evaluated at a common specific gravity and viscosity. Therefore power and torque readings are corrected to rated conditions for specific gravity and viscosity changes before any evaluation is done. This can be achieved by entering the specific gravity and viscosity vs. temperature curves in the controller. A simple temperature measuring device can then be used to correct power readings.

For constant temperature systems, corrections to power readings are not required and the protection method does not require traditional sensors.

Preventing nuisance faults is another important problem to resolve. This can occur when changes in power readings are due to a changing system condition; e.g. increases or decreases in discharge pressure. The change in power readings must be distinguished between normal system changes and increased or decreased power draw due to internal rubbing contact or dry run conditions. This is achieved in part by the basic pump protection algorithm where a speed change associated with changing conditions is allowed to re-stabilize at a constant speed with a +/− change. Once stabilized new power readings are sampled.

For gear pumps, the enhanced pump protection algorithm can distinguish between a torque ripple signature during normal operation and a torque ripple signature during a condition where the pump is in distress. If the torque ripple exceeds a predefined set point, then a dry run fault is declared. For progressive cavity pumps it was found that torque ripple is not a reliable method for determining if a dry run condition exists. It has been found through testing that these types of pumps can have an unstable torque signature. Therefore, a different approach was taken for enhanced pump protection for this type of pump. The algorithm for enhanced pump protection calculates a corrected high and low power ratio and compares it to a high and low power ratio set point to determine if a dry run condition exists.

In comparison, for twin screw pumps the enhanced pump protection algorithm can distinguish between a torque signature during normal operation and a torque signature during a condition where the pump is in distress. If the torque exceeds a predefined set point, then a dry run fault is declared.

The enhanced pump protection methodology can protect against difficult to detect dry run conditions which the basic pump protection algorithm cannot. These conditions occur at low operating speeds (e.g., down to 20:1 turndown from full load motor speed) and in systems operating at a low differential pressure.

One advantage of the new and unique basic pump protection is to provide a faster and more robust response to a dry run condition when the corrected tune ratio is greater than the tune ratio set point. Tune ratios above the set point value are associated with higher differential pressures. In this case, a response to a dry run condition can be identified more quickly than in enhanced protection methodology. The logic for these algorithms, for example, can be embedded in a variable frequency drive (VFD) or a programmable logic controller (PLC).

The Apparatus

According to some embodiments, the present invention may take the form of apparatus comprising a signal processor that may be configured to
  receive signaling containing information about power, torque, speed, viscosity and specific gravity related to the operation of a twin screw positive displacement pump; and
  determine whether to enter an enhanced pump protection mode for the twin screw positive displacement pump based at least partly on a relationship between an actual corrected tune ratio and a tuned ratio set point (Tune Ratio SP).

According to some embodiments of the present invention, the signal processor may be configured to determine if the actual corrected tune ratio is less than or equal to the actual corrected tune ratio set point (Tune Ratio SP), and if so, then to enter the enhanced pump protection mode, else to continue to use a basic pump protection mode.

According to some embodiments of the present invention, the signal processor may be configured to determine the actual corrected tune ratio based at least partly on a ratio of an actual corrected torque (TAcorr) divided by a tuned corrected torque (TTcorr) at a specific operating speed.

According to some embodiments of the present invention, the signal processor may also be configured to determine the actual corrected torque (TAcorr) based at least partly on a relationship between an actual torque (TACT) at the current speed, a rated specific gravity (SGRTD) of the fluid being pumped, an actual specific gravity (SGACT) of the fluid being pumped, a rated viscosity (VISCRTD) of the fluid being pumped, an actual viscosity (VISCACT) of the fluid being pumped.

For example, the signal processor may be configured to determine the actual corrected torque (TAcorr) based at least partly on the equation:

$$TAcorr = TACT \times (SGRTD/SGACT)/(VISCACT/VISCRTD)^{0.275}.$$

According to some embodiments of the present invention, the signal processor may be configured to determine the tuned corrected torque (TTcorr) based at least partly on a relationship between a measured or interpolated tuned value torque (TMEAS) at the current speed, a rated specific gravity (SGRTD) of the fluid being pumped, an actual specific gravity (SGACT) of the fluid being pumped, a rated viscosity (VISCRTD) of the fluid being pumped, an actual viscosity (VISCACT) of the fluid being pumped. For example, the signal processor may be configured to determine the tuned corrected torque (TTcorr) based at least partly on the equation:

$$TAcorr = TMEAS \times (SGRTD/SGACT)/(VISCACT/VISCRTD)^{0.275}.$$

According to some embodiments of the present invention, the tuned ratio set point (Tune Ratio SP) may include a default setting, e.g., including one default setting of about 1.3 for the twin screw positive displacement pump.

According to some embodiments of the present invention, the signal processor may be configured to provide a control signal containing information to control the operation of the twin screw positive displacement pump, including shutting the twin screw positive displacement pump off when a dry run condition is determined in the enhanced pump protection mode.

According to some embodiments of the present invention, the signal processor may also be configured as, or take the form of, a controller that controls the operation of the twin screw positive displacement pump.

According to some embodiments of the present invention, the apparatus may include the twin screw positive displacement pump itself in combination with the signal processor.

Enhanced Pump Protection Mode for Internal or External Gear, Lobe or Vane Pumps

The signal processor may also be configured to continuously compensate torque measurements for specific gravity and viscosity changes in systems where a process temperature is not constant.

The signal processor may also be configured to perform each evaluation while the pump is, e.g., at +/− a constant speed in order to distinguish between increasing/decreasing discharge pressure and an upset condition.

The signal processor may also be configured to detect a speed change and restart a protection mode algorithm.

Enhanced Pump Protection Mode for Progressive Cavity and Twin Screw Pumps

According to some embodiments of the present invention, when in the enhanced pump protection mode for the twin screw positive displacement pump, the signal processor may be configured to determine a corrected high and low torque ratio; and compare the corrected high and low torque ratio to a high and low torque ratio set point to determine if a dry run condition exists.

According to some embodiments of the present invention, the signal processor may be configured to determine if either
For Progressive Cavity Pumps:

PACT2CORR/PACT1CORR>=HI PRATIO SP or

PACT2CORR/PACT1CORR>=LO PRATIO SP; and

For Twin Screw Pumps:

TACT2CORR/TACT1CORR>=HI TRATIO SP or

TACT2CORR/TACT1CORR>=LO TRATIO SP; and if so, then to declare a dry run fault, else to operate the twin screw positive displacement pump in a normal condition, where
  TACT1CORR is a corrected torque reading for specific gravity and viscosity and is a mode value over an initial sample period,
  TACT2CORR is a continuously updated corrected torque reading for specific gravity and viscosity and is a mode value after the initial sample period,
  HI T RATIO SP is a default high torque ratio set point, and
  LO T RATIO SP is a default low power ratio set point.

According to some embodiments of the present invention, the signal processor may be configured to determine the corrected torque reading for specific gravity and viscosity based at least partly on the equation:

TACT1CORR=TACTx(SGRTD/SGACT)/(VISCACT/VISCRTD)$^{0.275}$.

According to some embodiments of the present invention, the signal processor may be configured to update the value of TACT1CORR under, e.g., the following conditions: when +/− a predetermined rpm speed change occurs, during pump start-up and after a predetermined operating time elapses.

According to some embodiments of the present invention, the signal processor may be configured to detect an inadvertently closed suction valve during startup by implementing the following;
  during start-up, once the speed set point has been reached, take an initial torque reading at some point after a timer begins;
  take subsequent torque readings at subsequent periodic intervals until the timer expires;
  compare each subsequent torque reading to the initial torque value; and
  determine if a current torque value/initial torque value<=some predetermined default setting, then issue a Dry Run Fault.

According to some embodiments of the present invention, the signal processor may be configured to determine a momentary peak P that exists directly after suction valve closure during dry run conditions and takes the form of a distinguishing characteristic between a dry run torque signature and a condition normal system change.

According to some embodiments of the present invention, the signal processor may be configured to determine if a dry run condition exists for Enhanced Pump Protection using a comparison of a corrected high and corrected low torque ratio to a high and low torque ratio set point.

According to some embodiments of the present invention, prior to making the comparison, the signal processor may be configured to determine if the momentary peak P exists by performing a sample torque check to see if the dry run condition exists due to a control valve being opened/closed.

According to some embodiments of the present invention, the signal processor may be configured to take sample torque readings at a minimum sample rate, and to compare an initial torque reading at constant speed to each successive torque reading.

According to some embodiments of the present invention, the signal processor may be configured to determine if greater than a predetermined number of comparisons are negative, and if so determined, then
  start a timer;
  evaluate at a given rate until the timer expires equations, as follows:

TACT2CORR/TACT1CORR>=HI TRATIO SP, and

TACT2CORR/TACT1CORR<=LO TRATIO SP, and either declare the dry run condition if one or both equations is true, or
declare a normal run condition if both equations are false, where
  TACT1CORR is a corrected torque reading for specific gravity and viscosity and is a mode value over an initial sample period,
  TACT2CORR is a continuously updated corrected torque reading for specific gravity and viscosity and is a value after the initial sample period,
  HI T RATIO SP is a default high torque ratio set point, and
  LOT RATIO SP is a default low torque ratio set point.

The Basic Pump Protection Mode

According to some embodiments of the present invention, when in a basic pump protection mode the signal processor may be configured to determine at the current operating speed if the actual corrected torque (TAcorr) is less than or equal to a dry run factor (KDR) multiplied by the tuned corrected torque (TTcorr), where the dry run factor (KDR) has a default setting, including about 0.95 and can be adjusted if nuisance trips occur; and if so, the signal processor is configured to declare a dry run fault, else to operate the twin screw positive displacement pump in a normal condition.

According to some embodiments of the present invention, the signal processor may be configured to keep the basic pump protection mode always active.

The Method

According to some embodiments, the present invention may take the form of a method comprising: receiving with a signal processor signaling containing information about power, torque, speed, viscosity and specific gravity related to the operation of a twin screw positive displacement pump; and determining whether to enter an enhanced pump protection mode for the twin screw positive displacement pump based at least partly on a relationship between an actual corrected tune ratio and a tuned ratio set point (Tune Ratio SP).

According to some embodiments of the present invention, the method may also include implementing one or more of the features set forth above.

BRIEF DESCRIPTION OF THE DRAWING

The drawing includes the following Figures:

FIG. 2 is a block diagram of apparatus according to some embodiments of the present invention.

FIG. 7 is a graph of torque (%) versus time (second) showing a function that includes a peak P in relation to a suction valve closure.

FIG. 8 is a flowchart of a pump protection mode, according to some embodiments of the present invention.

DETAILED DESCRIPTION OF THE INVENTION

Figure 1:
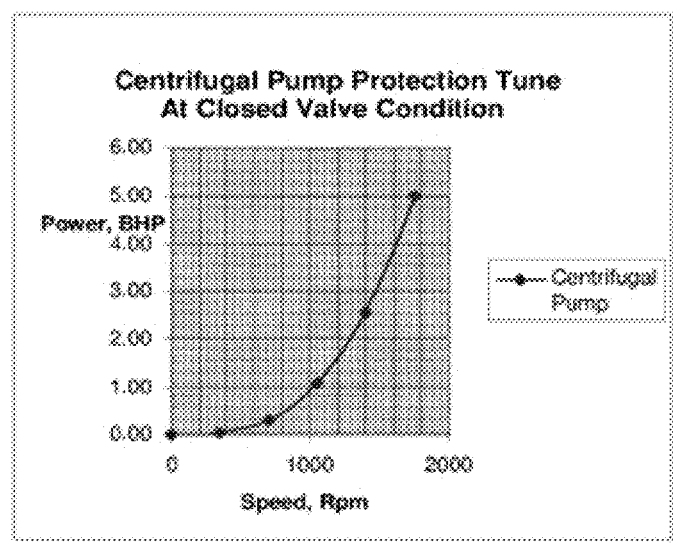
FIG. 1 is a graph of power (BHP) versus speed (RPM) for a centrifugal pump protection tune at a closed valve condition that is known in the art.

By way of example, as shown in FIG. 2, according to some embodiments, the present invention may take the form of apparatus 10 that includes a signal processor 12 configured to protect the operation a rotary positive displacement pump 14, e.g., which may include, or take the form of, a twin screw pump, an internal or external gear pump, a lobe pump, a vane pump or a progressive cavity pump.

The signal processor 12 may be configured to receive signaling containing information, e.g., about power, torque, speed, viscosity and specific gravity, related to the operation of the rotary positive displacement pump 14, and determine whether to enter an enhanced pump protection mode for the rotary positive displacement pump based at least partly on a relationship between an actual corrected tune ratio and a tuned ratio set point (Tune Ratio SP) else remain in the basic protection mode. The signal processor 12 may also be configured to provide a control signal containing information to control the operation of the rotary positive displacement pump 14, including shutting the rotary positive displacement pump off when a dry run condition is determined in the enhanced or basic pump protection mode.

The rotary positive displacement pump 14 may include a module 16 configured to provide the signaling containing information, e.g., about power, torque, speed, viscosity and specific gravity, related to the operation of the rotary positive displacement pump 14, and may also be configured to receive the control signal containing information to control the operation of the rotary positive displacement pump 14, including shutting the rotary positive displacement pump off when the dry run condition is determined in the enhanced or basic pump protection mode.

In operation, the signal processor 12 may be configured to determine if the actual corrected tune ratio is less than or equal to the actual corrected tune ratio set point (Tune Ratio SP), and if so, then to enter the enhanced pump protection mode, else to continue to use a basic pump protection mode. By way of example, for gear and progressive cavity pumps, the signal processor 12 may be configured to determine the actual corrected tune ratio based at least partly on a ratio of an actual corrected power (PAcorr) divided by a tuned corrected power (PTcorr) at a specific operating speed, consistent with that set forth in relation to section A below. By way of further example, for twin screw pumps, the signal processor 12 may be configured to determine the actual corrected tune ratio based at least partly on a ratio of an actual corrected torque (TAcorr) divided by a tuned corrected torque (TTcorr) at a specific operating speed, consistent with that set forth in relation to section B below. The logic for the basic and enhanced algorithms, for example, can be embedded in a variable frequency drive (VFD) or a programmable logic controller (PLC).

By way of example, implementations of the basic pump protection mode and the enhanced pump protection mode for gear and progressive cavity pumps and twin screw pumps are set forth in detail below:

A. Implementation for Gear and Progressive Cavity Pumps

In effect, the present invention consists of two types of positive displacement pump protection control logic which utilize the direct feedback of power, torque, speed, viscosity and specific gravity to calculate an actual corrected tune ratio consisting of the actual corrected power divided by the tuned corrected power at a specific operating speed. The power measurements are continuously compensated for specific gravity and viscosity changes in systems where process temperature is not constant. The corrected actual tune ratio is then compared to a tune ratio set point in a decision tree algorithm. If the calculated tune ratio is greater than the tune ratio set point basic pump protection becomes active.

The process for activating pump protection is to first do a protective tune which samples speed and power data at three or more speeds (e.g., five (5) speeds) while operating at rated conditions. (In contrast to techniques related to the tune process at the closed valve condition re centrifugal pumps, the tune process for dry run protection of rotary positive displacement pumps as described in this application is performed at rated conditions.) The protection functionality must be disabled during this process. If the pump is operating on a system with multiple system curves the protection tune should be performed with the pump operating on the system curve having least resistance. For the pump and system shown in FIG. 3 the protection tune would be performed while operating on system curve labelled A. This is necessary to avoid nuisance dry run faults when transitioning between higher to lower discharge pressures.

Once the protection tune is completed the pump protection functionality can be enabled.

Figure 4:
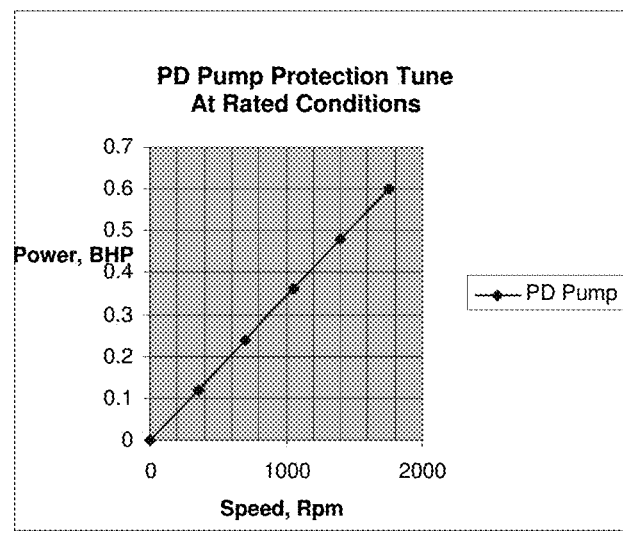
FIG. 4 is a graph of power (BHP) versus speed (RPM) for a rotary positive displacement pump protection tune at rated conditions.

In a positive displacement pump, the torque remains substantially constant for a constant differential pressure regardless of speed, and power will vary proportionally to the change in speed as shown in FIG. 4. The power curve in FIG. 4 for PD pumps varies directly with the change in speed (provided there is adequate suction pressure) for a given differential pressure. For centrifugal pumps power varies as the cube of the speed change (FIG. 1). Centrifugal pumps may operate at closed valve condition for short periods. It is not acceptable for positive displacement pumps to operate against a closed valve. Pressure will continue to build until pump damage occurs or the pump housing and/or piping ruptures.

After the protective tune has been completed and pump protection has been enabled the decision tree algorithm for basic pump protection becomes active as follows:

The Basic Pump Protection Mode

The following is an example of steps for the basic pump protection mode for a rotary positive displacement pump, including an internal or external gear pump, a lobe pump, a vane pump or a progressive cavity pump:

Pump Running

↓If true, then←←

Pump at Constant+/−Speed: If False, then→↑

↓If true, then

PAct Corr/PTune Corr<=Tune Ratio SP

If False, then→go to basic pump protection
If true, then→go to enhanced pump protection
The tune ratio at current operating speed is determined or calculated by the following set of equations:

PAct Corr/PTune Corr;

PACTCORR=PACT×(SGRTD/SGACT)/(VISCACT/VISCRTD)^0.275;

and

PTUNECORR=PMEAS×(SGRTD/SGACT)/(VISCACT/VISCRTD)^0.275, where:
PACT=actual power at current speed,
PMEAS=measured or interpolated tuned value power at current speed,
SGRTD=rated specific gravity,
SGACT=actual specific gravity,
VISCRTD=rated viscosity, and
VISCACT=actual viscosity.

The exponent of 0.275 is a default value although the scope of the invention is intended to include embodiments having a different exponent consistent with that now known or later developed in the future.

By way of example, for internal or external gear, lobe or vane PD pumps, the Tune Ratio SP (i.e. set point) has a default setting of 2.0; while for progressive cavity PD pumps, the Tune Ratio SP has a default setting of 1.3, although the scope of the invention is intended to include embodiments having a different default setting for the Tune Ratio SP.

If the basic pump protection is active, the following relationship is evaluated at the current operating speed by the equation:

PACTCORR<=KDR×PTUNECORR, where KDR is a dry run factor with a default setting of 0.9; although the scope of the invention is intended to include embodiments having a different default setting. Note the KDR value can be adjusted by the user if nuisance trips occur.

If PACTCORR<=KDR×PTUNECORR is false, then the condition of the PD pump is normal.

If PACTCORR<=KDR×PTUNECORR is true, then a dry run fault condition for the PD pump is declared.

Enhanced Pump Protection Mode

For rotary PD pumps, the enhanced pump protection mode may be used if the following condition is true:

PAct Corr/PTune Corr<=Tune Ratio SP

Consistent with that set forth below, one type of an enhanced pump protection mode is used for internal or external gear, lobe or vane PD pumps, and another type of an enhanced pump protection mode is used for progressive cavity PD pumps. In either enhanced pump protection mode, the basic pump protection may also remain active.

The Enhanced Pump Protection Mode for Internal or External Gear, Lobe or Vane Pumps For an internal or external gear, lobe or vane PD pump, the enhanced pump protection mode is based at least partly on the following torque ripple condition:

Torque Ripple Ratio>=Torque Ripple Set Point.

If the torque ripple condition is true, then a dry run fault is declared for the internal or external gear, lobe or vane PD pump.

In contrast, if the torque ripple condition is false, then the internal or external gear, lobe or vane PD pump has a normal condition.

Consistent with that set forth above, in this enhanced pump protection mode, the basic pump protection is always active, but enhanced pump protection (torque ripple) is only active when the tune ratio is less than or equal then the tune ratio set point.

In the enhanced pump protection mode, highest/lowest torque values may be compared to the torque ripple set point, e.g., during a 20 sample period. The sample period will typically depend on the monitor update rate. For example, for a 100 msec update rate the sample period is 2 sec. Note the torque measurements may be continuously compensated for specific gravity and viscosity changes in systems where the process temperature is not constant.

According to some embodiments of the present invention, the default setting for the torque ripple set point may be about 1.10, although the scope of the invention is intended to include embodiments having a different default setting.

Each evaluation may be performed while the pump is at +/− a constant speed in order to distinguish between increasing/decreasing discharge pressure and an upset condition. If a speed change is detected the algorithm restarts. In rotary positive displacement pumps the torque ripple during normal operating conditions is substantially less than in a dry run condition. As the rotor begins to lose lubrication and friction increases the torque begins to spike as the rotor goes in and out of lubricating conditions.

Figure 5:
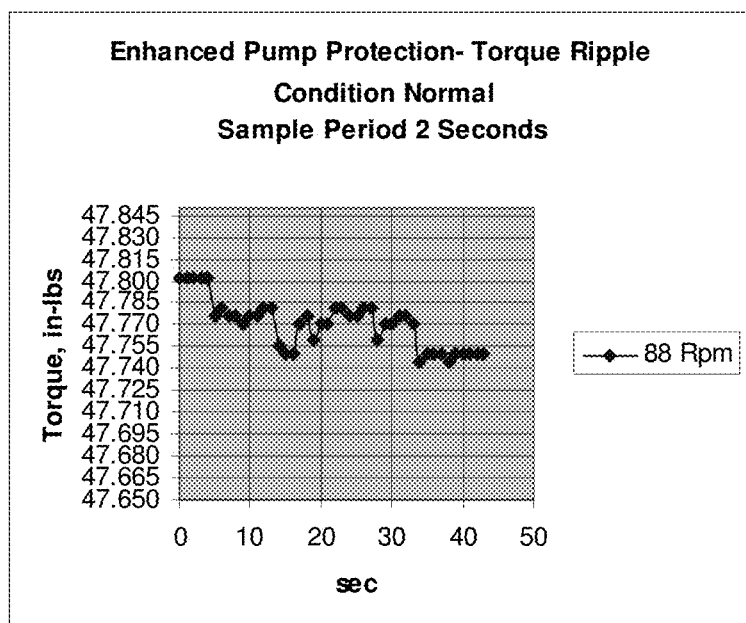
FIG. 5 is a graph of torque (in-lbs) versus time (sec) for enhanced pump protection—torque ripple condition normal.
Figure 6:
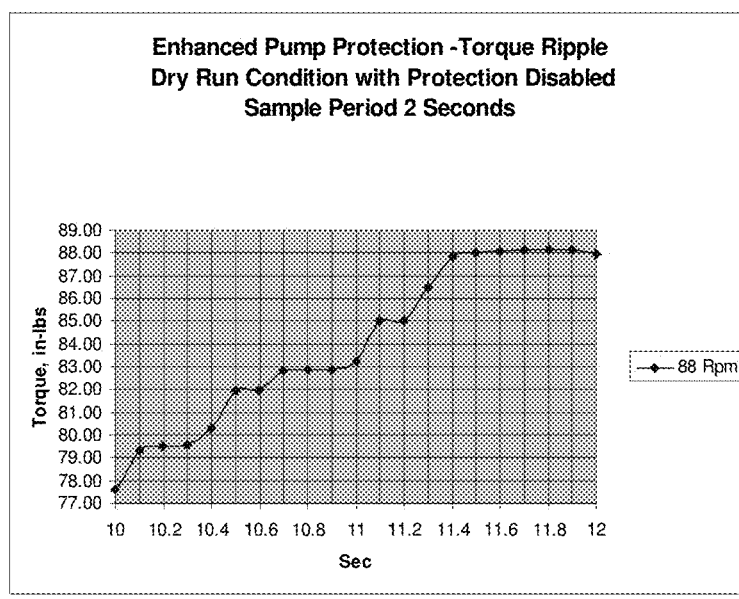
FIG. 6 is a graph of torque (in-lbs) versus time (sec) for enhanced pump protection—torque ripple dry run condition.

FIG. 5 shows a graph of torque (in-lbs) versus time (sec) as an example for enhanced pump protection—torque ripple condition normal. In FIG. 5, the normal operating conditions are shown at 88 rpm (20:1 turndown in maximum speed). For normal operation, the torque ripple is less than 1%. FIG. 6 also shows a 2 second snapshot of a dry run condition also at 88 rpm which quickly exceeds the torque ripple set point of 1.10. In contrast, and by way of comparison, FIG. 6 shows a graph of torque (in-lbs) versus time (sec) as an example for enhanced pump protection—torque ripple dry run condition.

Enhanced Pump Protection Mode for Positive Displacement Progressive Cavity Pumps For progressive cavity pumps, the algorithm for basic pump protection is very similar to other rotary positive displacement pumps including the requirement for a protective tune. However, the default setting for the tune ratio set point is 1.3 for this type of pump; although the scope of the invention is intended to include embodiments having a different default set. For progressive cavity pumps it was found that torque ripple is not a reliable method for determining if a dry run condition exists. It has been found through testing that these types of pumps can have an unstable torque signature. Therefore, a different approach was taken for enhanced pump protection for this type of pump. The algorithm for enhanced pump protection calculates a corrected high and low power ratio and compares it to a high and low power ratio set point (HI P RATIO SP and LO P RATIO SP) to determine if a dry run condition exists.

By way of example, the enhanced pump protection mode is based at least partly on the following high/low power condition:

$$PACT2CORR/PACT1CORR >= HI\ P\ RATIO\ SP$$

or $$PACT2CORR/PACT1CORR <= LO\ P\ RATIO\ SP.$$

If either high/low power condition is true, then→a dry run fault is declared for the progressive cavity PD pump.

In contrast, if the high/low power condition is false, then→the progressive cavity PD pump has a normal condition.

The parameter PACT1CORR is a corrected power reading for specific gravity and viscosity as shown by the equation below:

$$PACTCORR = PACT \times (SGRTD/SGACT)/(VISCACT/VISCRTD)^{0.275}.$$

The exponent of 0.275 is a default value, although the scope of the invention is intended to include embodiments having a different exponent.

For constant temperature systems no corrections are required.

By way of example, the value of PACT1 CORR may be updated under the following conditions: when +/− an rpm speed change occurs, during a pump start-up and after a 1 hr operating time elapses, although the scope of the invention is intended to include embodiments having a different +/− rpm speed change and/or a different operating time elapsing. The value of PACT1 CORR may be the mode value, e.g., over a predetermined sample period, e.g., a 20 sample period. The sample period will depend on the monitor update rate.

The value of PACT2CORR may be continuously updated using the aforementioned equation. The value of PACT2CORR may be the mode value, e.g., over a predetermined sample period, e.g., a 20 sample period.

The ratio of PACT2CORR/PACT1CORR may be continuously updated and compared to the high power ratio set point HI P RATIO SP and the low power ratio set point LO P RATIO SP. The calculated value of the ratio PACT2CORR/PACT1CORR may be based on the mode value, e.g., over a predetermined sample period, e.g., a 20 sample period.

The default set point for the high power ratio set point HI P RATIO SP may be, e.g. about 1.2, although the scope of the invention is intended to include embodiments having a different default setting.

The default set point for the low power ratio set point LO P RATIO SP may be, e.g. about 0.80, although the scope of the invention is intended to include embodiments having a different default setting.

Consistent with that set forth above, the above algorithms for the basic pump protection mode may always be active, but the enhanced pump protection mode is only active when the tune ratio is less than or equal then the tune ratio set point.

B. Implementation for Twin Screw Pumps

This invention consists of three modules of twin screw positive displacement pump protection: a startup module, basic pump protection module and enhanced pump protection module.

Start-up Module

The intent of the startup module is to detect an inadvertently closed suction valve during startup which can occur due to operator error. The start-up module is an optional module which offers protection as a one-time check during initial start-up.

During start-up, once the speed set point has been reached an initial torque reading is taken, e.g., 12 sec after a timer begins. A torque reading may be taken, e.g., every 30 sec thereafter, until the timer expires. Each subsequent torque reading may be compared to the initial torque value. If the current torque value/initial torque value<=0.97, then a Dry Run Fault may be issued. During the Start-up Module check, no changes should to be made to the system (e.g. speed changes, valve changes) until the timer expires. In constant temperature applications, e.g., such as unloading applications, a drop in torque would likely indicate a temperature increase in the suction line if the suction valve is closed prior to startup. As temperature increases specific gravity is reduced and the torque requirement is lowered. If a Dry Run Fault is detected, then the drive faults immediately and does not wait for the timer to expire. If the drive is shutdown before the timing cycle is completed, then the Start-up Module will reset itself, if active. In contrast, if the current torque value/initial torque value>0.97, then the condition is normal and the start-up module is disabled. The default timer value at rated speed is, e. g, 2 minutes. The timer duration may be extended for speeds less than rated. It is not the intent of the present invention to limit either the timer value or the current torque value/initial torque value ratio to any specific value. The 2 minute timer value at rated speed is settable by the user via parameter. Additionally, the default torque ratio value of 0.97 is also settable via parameter. At minimum speed, the torque ratio value of 0.97 may be reduced slightly to 0.975 to avoid prolonged timer values. During the Start-up Module check, a user message may appear on the HMI "Start-up Check". Once the timer expires and the condition is normal, a user message may appear on the HMI "Start-up Check Success" and the start-up module is disabled. If a speed change is detected>=2% during the "Startup Check", then the Start-up algorithm is aborted and a message "Startup Protection Aborted" is displayed. The Twin Screw Pump then resumes normal operation.

Protective Tune Module

The protective tune may be implemented similar to that set forth above. For example, the process for activating pump protection is to first do a protective tune which samples speed, torque or power data, e.g., at five speeds, while operating at rated conditions. The protection functionality must be disabled during this process. If the pump is operating on a system with multiple system curves, then the protection tune should be performed with the pump operating on the system curve having least resistance. For the pump and system shown in FIG. 1, the Protection Tune would be performed while operating on system curve labeled A. This is necessary to avoid nuisance dry run faults when transitioning between higher to lower differential pressures.

Consistent with that set forth above, once the protection tune is completed the pump protection functionality can be enabled.

Figure 3:
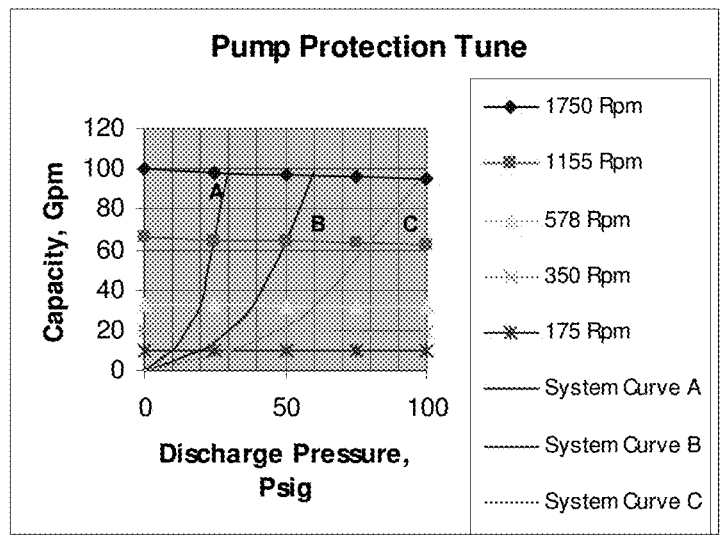
FIG. 3 is a graph of capacity (GPM) versus discharge pressure (PSIG) for a pump protection tune.

As shown in FIG. 2 the power curve for PD pumps varies directly with the change in speed (provided there is adequate suction pressure) for a given differential pressure. For centrifugal pumps, power varies as the cube of the speed change (FIG. 3). Centrifugal pumps may operate at closed valve condition for short periods. However, noted that it is typically not acceptable for positive displacement pumps to operate against a closed valve. Pressure will continue to build until pump damage occurs or the pump housing and/or piping ruptures.

The control logic for basic and enhanced pump protection utilizes the direct feedback of power, torque and speed to calculate an actual corrected tune ratio consisting of the actual corrected torque divided by the tuned corrected torque at a specific operating speed. The torque measurements may be continuously compensated for specific gravity and viscosity changes in systems where process temperature is not constant. The corrected actual tune ratio may then be compared to a tune ratio set point in a decision tree algorithm. If the calculated tune ratio is greater than the tune ratio set point, then the basic pump protection becomes active; otherwise enhanced pump protection becomes active.

Once the protection tune is completed the pump protection functionality can be enabled.

Once pump protection has been enabled the decision tree algorithm for basic pump protection is as follows:

Basic Pump Protection Module

Pump Running

↓ If true←←

Pump at Constant+/−Speed: If False→↑

↓ If true $T_{act}$ Corr/$T_{tune}$ Corr<=Tune Ratio $SP$

If False, then go to basic pump protection.
If true, then go to enhanced pump protection.
The tune ratio at current operating speed may be determined or calculated by the following set of equations:

$T_{act}$ Corr/$T_{tune}$ Corr

TACTCORR=TACT×(SGRTD/SGACT)/(VISCACT/VISCRTD)^0.275

TTUNECORR=TMEAS×(SGRTD/SGACT)/(VISCACT/VISCRTD)^0.275, where:
TACT=actual torque at current speed,
TMEAS=measured or interpolated tuned value torque at current speed,
SGRTD=rated specific gravity,
SGACT=actual specific gravity,
VISCRTD=rated viscosity, and
VISCACT=actual viscosity.

The exponent of 0.275 is a default value, although the scope of the invention is intended to include embodiments having a different exponent.

By way of example, for twin screw pumps the Tune Ratio Set point may have a default setting of 1.3. However, it is not the intent of this invention to limit the value of the Tune Ratio Set Point to a specific value. The Tune Ratio Set Point value may be changeable by the user, e.g., as a selected parameter.

Once pump protection is enabled basic pump protection is always active, and the following relationship is evaluated at the current operating speed:

TACTCORR<=KDR×TTUNECORR, where KDR is a dry run factor that may have a default setting of 0.95. It is not the intent of this invention to limit the value of KDR to a specific value. The KDR value may be changeable by the user, e.g., as a selected parameter.

If nuisance trips occur the KDR value can be adjusted, based upon the following:

TACTCORR<=KDR×TTUNECORR

If False, then the condition is normal.
If True, then a dry run fault is declared.

Enhanced Pump Protection Module

The enhanced pump protection module may be used if the following decision tree argument is true:

$T_{act}$ Corr/$T_{tune}$ Corr<=Tune Ratio $SP$.

If true, then go to Enhanced Pump Protection.

Note in the above decision tree argument the Basic Pump Protection Module is always active but the Enhanced Pump Protection Module is only active when the Tune Ratio is less than or equal to the Tune Ratio Set Point.

For twin screw pumps, the algorithm for Basic Pump Protection is similar to other rotary positive displacement pumps.

However, it was found thru testing that torque signatures can differ greatly between rotary PD pumps and twin screw pumps. For example, rotary PD pumps can provide a robust torque ripple signature when operating under dry run conditions due to rotor to rotor rubbing contact (gear pumps) or rotor to stationary housing contact (progressive cavity pumps). In contrast, twin screw pumps can have a torque signature which provides little change between normal operating conditions and a distressed operating condition. Therefore, it was found that the algorithms created for rotary PD pumps like gear and progressive cavity pumps, e.g., as set forth above, cannot reliably detect dry run conditions for twin screw pumps.

As shown in FIG. 7, when simulating dry run conditions it was found that a momentary peak labelled P exists directly after suction valve closure. This peak P was found to be consistent at all speeds and differential pressures tested. This peak P was found to be the only distinguishing characteristic between a dry run torque signature and a condition normal system change.

The algorithm for Enhanced Pump Protection determines or calculates a corrected high and corrected low torque ratio and compares it to a high and low torque ratio set point to determine if a dry run condition exists. However, prior to evaluating these arguments, a check may be made to determine whether the condition is due to a control valve being opened/closed or a dry run condition. This may be done by determining if the aforementioned peak exists by doing a sample torque check as follows:

By way of example, 200 sample torque readings may be taken at a minimum sample rate of 100 msec. An initial torque reading at constant speed (+/−5 Rpm) is compared to each successive torque reading as follows: (initial torque reading−torque reading "N") . . . N+1, N+2, . . . , N+199. If<=4 evaluations are negative, then it is assumed all readings are positive (decreasing) or equal to zero (constant); this can occur if the control valve is opening and the evaluation block as shown in FIG. 8 stating "Are Sample Readings Constant or Decreasing?" is true and the Enhanced Pump Protection Module is deactivated and the Basic Pump Protection Module only becomes active. Note if the control valve is closing then the Tune Ratio Set Point may be exceeded (under the Basic Pump Protection Module) and the Enhanced Pump Protection Module is then deactivated. If >4 evaluations are negative, then the evaluation block as shown in FIG. 8 stating "Are Sample Readings Constant or Decreasing?" becomes false. A 2 minute timer may then be started, and the arguments

TACT2CORR/TACT1CORR>=$HI$ $TRATIO$ $SP$

TACT2CORR/TACT1CORR<=$LO$ $TRATIO$ $SP$ are evaluated at a minimum rate, e.g., of every 100 msec, until the two minute timer expires. If the 2 minute timer expires with both arguments being false, the condition is normal and the algorithm resets itself. If one or both of the arguments are true, then a dry run fault is immediately issued. The default values of HIT Ratio SP and LOT Ratio SP are 1.10 and 0.9, respectively. It is not the intent of this invention to limit the HI or LO T Ratio Set Points or the timer setting to a specific value.

The HI or LO T Ratio setpoint value is changeable by the user via parameter. Moreover, by way of example, the number evaluations used is four (4), although the scope of the invention is not intended to be limited to the number of evaluations, and embodiments are envisioned using a number of evaluations greater than 4, or less than 4, within the spirit of the present invention.

Note in the above algorithms the Basic Pump Protection Module is always active but the Enhanced Pump Protection Module is only active when the Tune Ratio (TACT CORR/T TUNE CORR) is equal to or less than the TUNE RATIO SP.

TACT2CORR/TACT1CORR>=$HI$ $TRATIO$ $SP$ or

TACT2CORR/TACT1CORR<=$LO$ $TRATIO$ $SP$, where

TACT1CORR is a corrected torque reading for specific gravity and viscosity as shown below, and

TACTCORR=TACT×(SGRTD/SGACT)/(VISCACT/VISCRTD)^0.275.

The exponent of 0.275 is a default value, although the scope of the invention is intended to include embodiments having a different exponent.

For constant temperature systems, no corrections is typically required.

The value of TACT1CORR may be updated under the following conditions: a +/−2 rpm speed change occurs, during pump start-up and after, e.g., 1 hr of operating time elapses.

The calculated value of TACT2CORR/TACT1CORR may be based on the mode value, e.g., over a 20 sample period.

FIG. 8 shows a flowchart generally indicated as 100 for implementing the aforementioned pump protection mode, e.g., having steps a through n.

The Signal Processor 12

The signal processor 12 performs the basic signal processing functionality of the apparatus for implementing the present invention. The signal processor 12 may be a stand alone signal processing module, form part of a controller, controller module, etc., or form part of some other module of the apparatus 10. Many different types and kind of signal processors, controllers and controller modules for controlling pumps are known in the art, for example, including programmable logic controllers and variable frequency drives. By way of example, based on an understanding of such known signal processing modules, controllers and control modules, a person skilled in the art would be able to configure the signal processor 12 to perform the functionality consistent with that described herein, including to receive the signaling containing information about power, torque, speed, viscosity and specific gravity related to the operation of a twin screw positive displacement pump; and to determine whether to enter an enhanced pump protection mode for the twin screw positive displacement pump based at least partly on a relationship between an actual corrected tune ratio and a tuned ratio set point (Tune Ratio SP) else remain in the basic protection mode. By way of further example, based on an understanding of such known signal processing modules, controllers and control modules, a person skilled in the art would be able to configure the signal processor 14 to perform functionality consistent with that described herein, including to determine if the actual corrected tune ratio is less than or equal to the actual corrected tune ratio set point (Tune Ratio SP), and if so, then to enter the enhanced pump protection mode, else to continue to use a basic pump protection mode, as well as to determine the actual corrected tune ratio based at least partly on a ratio of an actual corrected torque (TAcorr) divided by a tuned corrected torque (TTcorr) at a specific operating speed.

By way of still further example, the functionality of the signal processor may be implemented using hardware, software, firmware, or a combination thereof, although the scope of the invention is not intended to be limited to any particular embodiment thereof. In a typical software implementation, such a module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation.

The signal processor, controller or controller module may include other modules to perform other functionality, that does not form part of the underlying invention, and that is not described in detail herein.

The Rotary Positive Displacement Pump 14

The rotary positive displacement pump like element 14, and rotary positive displacement pumps in general, are known in the art, e.g., which may include a twin screw pump, an internal or external gear pump, a lobe pump, a vane pump or a progressive cavity pump, and not described in detail herein. Moreover, the scope of the invention is not intended to be limited to any particular type or kind thereof. By way of example, such rotary positive displacement pumps are understood to include a motor or motor portion for driving a pump or pump portion, as well as some module like element 16 for example a programmable logic controller (PLC) or variable frequency drive (VFD) for implementing some functionality related to controlling the basic operation of the motor for driving the pump 14. By way of example, and consistent with that set forth herein, the motor is understood to receive control signals from the signal processor in order to drive and control the rotary positive displacement pump to pump fluid. The motor is also understood to provide the signaling containing information about power, torque and speed related to the operation of the pump.

OTHER POSSIBLE APPLICATIONS

Other possible applications include at least the following:

Pump Protection Algorithms—sensorless dry run protection can provide a reliable method for positive displacement pump fault tolerance during system upset conditions or operator error. In constant temperature systems this can be achieved without the added cost and complexity of external sensors. By way of example, such possible applications are envisioned for positive displacement pumps, such as a twin screw pump, an internal or external gear pump, a lobe pump, a vane pump or a progressive cavity pump, consistent with that set forth herein.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

We claim:

1. A method to protect a twin screw positive displacement pump, the method comprising:
   receiving, by a signal processor, a signal, wherein the signal includes information about power, an actual torque, a current speed, an actual viscosity and an actual specific gravity related to the operation of the twin screw positive displacement pump;
   determining, by the signal processor, an actual corrected torque, wherein the actual corrected torque is based on the actual torque at the current speed, the actual specific gravity of a fluid being pumped, the actual viscosity of the fluid being pumped, a rated viscosity of the fluid being pumped, and a rated specific gravity of a fluid being pumped, wherein the rated viscosity and rated specific gravity are determined when the twin screw pump is operated to rated conditions;
   determining, by the signal processor, a tuned corrected torque at a specific operating speed, wherein the tuned corrected torque is based on an interpolated tuned value torque at the current pump speed, the rated specific gravity, the actual specific gravity, the rated viscosity, and the actual viscosity;
   determining, by the signal processor, an actual corrected tune ratio based on a ratio of the actual corrected torque divided by the a tuned corrected torque; and
   determining, by the signal processor, to enter a pump protection mode for the twin screw positive displacement pump based on a comparison of the actual corrected tune ratio with a tuned ratio set point.

2. The method of claim 1 further comprising, prior to determining the actual corrected torque, determining, by the signal processor, if a dry run fault is detected.

3. The method of claim 2, wherein determining if a dry run fault is detected comprises:
   receiving, by the signal processor, an initial actual torque value, wherein the initial actual torque value is received in the signal;
   comparing, by the signal processor, a subsequent actual torque value to the initial actual torque value; wherein the subsequent actual torque value is received in the signal at a time subsequent to the initial actual torque value; and
   determining a dry run fault based on the comparison.

4. The method of claim 2, wherein determining if a dry run fault is detected comprises:
   determining, by the signal processor, a first corrected torque reading, wherein the first corrected torque reading is based on an actual specific gravity and an actual viscosity at an initial sample period,
   determining, by the signal processor, a second corrected torque reading, wherein the second corrected torque reading is based on an actual specific gravity and an actual viscosity at a second time value after the initial sample period; and
   determining, by the signal processor, a dry run fault based on a predetermined default high torque ratio set point, and a predetermined default low torque ratio set point.

5. The method of claim 4, wherein the predetermined default high torque ratio set point and the predetermined default low torque ratio set point are changeable by a user.

6. The method of claim 4, wherein the second time value is 2 minutes after the initial sample period.

7. The method of claim 1, wherein the tuned ratio set point is set by a user.

8. The method of claim 1, wherein the tuned ratio set point is 1.3.

9. The method of claim 1, further comprising;
   determining, by the signal processor, a momentary peak that exists directly after a suction valve closure during dry run conditions; and
   determining, by the signal processor, to enter the pump protection mode for the twin screw positive displacement pump based on the actual corrected tune ratio, the tuned ratio set point, and the peak P.

10. The method of claim 1, wherein the determination to enter a pump protection mode for the twin screw positive displacement pump is based on the actual corrected tune ratio being less than or equal to the tuned ratio set point.

11. The method of claim 1, wherein the determination to enter a pump protection mode for the twin screw positive displacement pump is based on the actual corrected tune ratio being greater than the tuned ratio set point, the method further comprising:
- determining, by the signal processor, a dry run factor; and
- determining, by the signal processor, to enter the pump protection mode for the twin screw positive displacement pump based on a comparison of the actual corrected torque with the dry run factor and the tuned corrected torque.

12. A method to protect a twin screw positive displacement pump, the method comprising:
- receiving, by a signal processor, a signal, wherein the signal includes information about power, an actual torque, a current speed, an actual viscosity and an actual specific gravity related to the operation of the twin screw positive displacement pump;
- determining, by the signal processor, an actual corrected torque, wherein the actual corrected torque is based on the actual torque at the current speed, the actual specific gravity of a fluid being pumped, the actual viscosity of the fluid being pumped, a rated viscosity of the fluid being pumped, and a rated specific gravity of a fluid being pumped, wherein the rated viscosity and rated specific gravity are determined when the twin screw pump is operated to rated conditions;
- determining, by the signal processor, a tuned corrected torque at a specific operating speed, wherein the tuned corrected torque is based on an interpolated tuned value torque at the current pump speed, the rated specific gravity, the actual specific gravity, the rated viscosity, and the actual viscosity;
- determining, by the signal processor, an actual corrected tune ratio based on a ratio of the actual corrected torque divided by the a tuned corrected torque; and
- compensating, by the signal processor, the torque measurements for a change in a value of a specific gravity and a change in a value for a viscosity of a fluid in the system due to a change in a temperature of the system; and
- determining, by the signal processor, to enter a pump protection mode for the twin screw positive displacement pump when the actual corrected tune ratio is less than or equal to a tuned ratio set point.

13. The method of claim 12, wherein the tuned ratio set point includes a default setting of 1.3 for the twin screw positive displacement pump.

14. The method of claim 12, further comprising, prior to determining the actual corrected torque, determining, by the signal processor, if a dry run fault is detected.

15. The method of claim 14, wherein determining if a dry run fault is detected comprises:
- receiving, by the signal processor, an initial actual torque value, wherein the initial actual torque value is received in the signal;
- comparing, by the signal processor, a subsequent actual torque value to the initial actual torque value; wherein the subsequent actual torque value is received in the signal at a time subsequent to the initial actual torque value; and
- determining a dry run fault based on the comparison.

16. The method of claim 14, wherein determining if a dry run fault is detected comprises:
- determining, by the signal processor, a first corrected torque reading, wherein the first corrected torque reading is based on an actual specific gravity and an actual viscosity at an initial sample period,
- determining, by the signal processor, a second corrected torque reading, wherein the second corrected torque reading is based on an actual specific gravity and an actual viscosity at a second time value after the initial sample period; and
- determining, by the signal processor, a dry run fault based on a predetermined default high torque ratio set point, and a predetermined default low torque ratio set point.

17. The method of claim 16, wherein the predetermined default high torque ratio set point and the predetermined default low torque ratio set point are changeable by a user.

18. The method of claim 16, wherein the second time value is 2 minutes after the initial sample period.

19. The method of claim 12, further comprising;
- determining, by the signal processor, a momentary peak that exists directly after a suction valve closure during dry run conditions; and
- determining, by the signal processor, to enter the pump protection mode for the twin screw positive displacement pump based on the actual corrected tune ratio, the tuned ratio set point, and the peak P.

* * * * *